United States Patent
Kim et al.

(10) Patent No.: US 7,072,550 B2
(45) Date of Patent: Jul. 4, 2006

(54) METHOD OF DETERMINING QUASI-PHASE MATCHING EFFICIENCY IN PERIODICALLY POLED STRUCTURE OF OPTICAL WAVEGUIDE, PERIODICALLY POLED STRUCTURE OF OPTICAL WAVEGUIDE, AND OPTICAL WAVEGUIDE USING THE SAME

(75) Inventors: Jong Bae Kim, Daejon-Shi (KR); Jung Jin Ju, Daejon-Shi (KR); Min Su Kim, Daejon-Shi (KR)

(73) Assignee: Electronics and Telecommunications Research Institute, Daejon-Shi (KR)

( * ) Notice: Subject to any disclaimer, the term of this patent is extended or adjusted under 35 U.S.C. 154(b) by 190 days.

(21) Appl. No.: 10/887,867

(22) Filed: Jul. 12, 2004

(65) Prior Publication Data
US 2005/0008297 A1    Jan. 13, 2005

(30) Foreign Application Priority Data
Jul. 12, 2003    (KR) .................... 10-2003-0047636

(51) Int. Cl.
    G02B 6/00    (2006.01)

(52) U.S. Cl. .................... 385/122; 385/1; 385/2; 385/3; 385/37; 385/40; 385/129; 385/130

(58) Field of Classification Search .......... 385/1, 385/2, 3, 9, 10, 11, 14, 37, 39, 40, 122, 129, 385/130, 131, 132
See application file for complete search history.

(56) References Cited

U.S. PATENT DOCUMENTS

| | | | |
|---|---|---|---|
| 4,865,406 A * | 9/1989 | Khanarian et al. | 385/122 |
| 4,971,416 A * | 11/1990 | Khanarian et al. | 359/328 |
| 5,058,970 A | 10/1991 | Schildkraut et al. | |
| 5,061,028 A | 10/1991 | Khanarian et al. | |
| 5,317,666 A | 5/1994 | Agostinelli et al. | |
| 5,617,499 A | 4/1997 | Brueck et al. | |
| 5,768,462 A | 6/1998 | Monte | |
| 5,943,464 A | 8/1999 | Khodja et al. | |
| 5,966,233 A | 10/1999 | Fujiwara et al. | |
| 6,751,386 B1 * | 6/2004 | Bonfrate et al. | 385/122 |
| 2005/0008297 A1 * | 1/2005 | Kim et al. | 385/40 |

FOREIGN PATENT DOCUMENTS

JP    07-013211    1/1995    ............. 385/122 X

OTHER PUBLICATIONS

Simon Fleming, et al.; "*Poled Fibre Devices for Electro-Optic Modulation*"; Invited Paper; SPIE vol. 2893; pp. 450-459.

(Continued)

*Primary Examiner*—Brian Healy
(74) *Attorney, Agent, or Firm*—Mayer, Brown, Rowe & Maw LLP (57) ABSTRACT

The present invention relates to a method of determining a quasi-phase matching efficiency in a periodically poled structure of an optical waveguide, a periodically poled structure of an optical waveguide, and an optical waveguide using the same. It is possible to effectively perform a quasi-phase matching when a width of periodic electrodes is shorter than a coherence length generally used as ½ of a quasi-phase matching period.

18 Claims, 11 Drawing Sheets

OTHER PUBLICATIONS

V. Taggi, et al.; "*Domain inversion by pulse polling in polymer films*"; Applied Physics Letters; vol. 72, No. 22; Jun. 1, 1998; pp. 2794-2796.

Yuji Azumai, et al.; "*Enhanced SHG Power Using Periodic Poling of Vinylidence Cyanide/Vinyl Acetate Copolymer*"; IEEE Journal of Quantum Electronics; vol. 30, No. 8; Aug. 1994; pp. 1924-1932.

V. Pruneri, et al.; "*Frequency doubling of picosecond pulses in periodically poled D-shape silica fibre*"; Electronics Letters; vol. 33; No. 4; Feb. 13th 1997; pp. 318-319.

V. Pruenri, et al.; "*Greater than 20%-efficient frequency doubling of 1532-nm nanosecond pulses in quasi-phase-matched qermanosilicate optical fibers*"; Optics Letters; vol. 24, No. 4; Feb. 15, 1999; pp. 208-210.

* cited by examiner

METHOD OF DETERMINING QUASI-PHASE MATCHING EFFICIENCY IN PERIODICALLY POLED STRUCTURE OF OPTICAL WAVEGUIDE, PERIODICALLY POLED STRUCTURE OF OPTICAL WAVEGUIDE, AND OPTICAL WAVEGUIDE USING THE SAME

BACKGROUND OF THE INVENTION

1. Field of the Invention

The present invention relates to a method of determining a quasi-phase matching efficiency in a periodically poled structure of an optical waveguide, a periodically poled structure of an optical waveguide and an optical waveguide using the same, and more specifically to a periodically poled structure capable of maximizing a conversion efficiency in a non-linear optical phenomenon by determining an optimum length of electrodes for a quasi-phase matching.

2. Description of the Related Art

In the study of optical phenomena related to a non-linearity, one of the main concerns has been focused on the achievement of higher conversion efficiency in such phenomenological processes. Quasi-phase matching, which intentionally drives light waves to an interaction with a periodic structure of a nonlinear material, was introduced for the purpose (Phys. Rev., vol. 127, pp. 1918–1939, 1962, entitled "Interactions between light in a non-liner dielectric", written by J. A. Armstrong, N. Bloembergen, J. Ducuing, and P. S. Pershan). The method of the quasi-phase matching by periodic poling was applied to such materials as lithium niobate, a silica fiber, and a polymer waveguide to obtain second harmonic generations successfully.

In a physical point of view, poling is to reconstruct or induce the second order nonlinear coefficient of the materials by means of an external electric field and the periodic poling is to impose an additional periodicity on the nonlinear coefficient. The exact origin of the non-linearity induction is not known yet but it is on the whole believed that the poled status and degree of the nonlinear materials are explicitly dependent on the applied electric field. In the periodic poling, a distribution of the external electric field as well as its intensity plays a crucial role in fitting the required quasi phase matching to improve the conversion efficiency.

In a conventional fabrication method of a quasi phase matching electrode in normal metal-contact poling, the electrode is as a rule designed to fit ½ of a quasi phase matching period, assuming that the region in contact with the electrode is under a constant field provided by the periodic electrode but the remaining half region in the period is in the absence of any field. In spite of such intension, the field leakage out of the periodic electrode region is unavoidable and undoubtedly believed to diminish the poling efficiency in a severe way. Therefore, a solution to this problem has been required.

SUMMARY OF THE INVENTION

The present invention is therefore contrived to solve the above problems and it is an object of the present invention to provide a periodically poled structure of an optical waveguide capable of improving a quasi-phase matching efficiency.

It is another object of the present invention to optimize a width and a voltage of periodic electrodes, a distance between the electrodes or the like to maximize a conversion efficiency in a second order non-linear phenomenon by analyzing a macroscopic distribution of non-linearity induced from a periodically poled structure of an optical waveguide.

It is still another object of the present invention to perform comparison and analysis from the quantitative point of view to surely increase a conversion efficiency in a second non-linear phenomenon in various types of poling structures classified on the basis of the periodically poled structure of an optical waveguide.

According to an aspect of the present invention, as a technical means for solving the aforementioned problems, a periodically poled structure of an optical waveguide with periodic electrodes for inducing a quasi-phase matching, wherein a width w of a periodic electrode is shorter than ½ of a quasi-phase matching period, is provided.

The aforementioned optical waveguide may comprise: a core and a cladding for propagating optical wave; first periodic electrodes formed on one surface of the cladding; and second periodic electrodes formed on the other surface of the cladding, wherein widths w of the first and second electrodes are shorter than ½ of the quasi-phase matching period.

Furthermore, the first and second periodic electrodes may be arranged at an interval of coherence length Lc by every two pairs of the first and second electrodes. In this case, a pulse poling structure in which opposite voltages are alternatively applied to each pair of the first and second periodic electrodes with a predetermined time difference may be used.

Furthermore, the first and second periodic electrodes may be arranged at an interval (2 Lc) of two times the coherence length Lc. In this case, a voltage for DC poling can be applied to the first and second periodic electrodes.

On the other hand, the optical waveguide comprises a core and a cladding for propagating an optical wave; periodic electrodes formed on one surface of the cladding; and a flat electrode formed on the other surface of the cladding, wherein a width w of the periodic electrode is shorter than ½ of the quasi-phase matching period. Preferably, a distance between the electrodes is 10 Lc or less, and a width of the periodic electrode is 0.1 Lc to 0.8 Lc.

Furthermore, an electric field applied to the electrodes is calculated in accordance with the periodically poled structure, a width of the periodic electrode, a distance between electrodes, and the voltage applied to the electrodes, and a mean distribution of non-linear optical coefficients contributing to a poling electric field distribution may be defined from a distribution of non-linear optical coefficients induced from the calculated electric field, thereby determining a quasi-phase matching efficiency, and the width of the periodic electrode and the distance between the electrodes may be determined such that the quasi-phase matching efficiency falls within a range of 10% of the maximum value to the maximum value in the quasi-phase matching distribution of the non-linear optical coefficients depending on the distance between the electrodes and the width of the periodic electrode.

According to another aspect of the present invention, an optical waveguide having a periodically poled structure may comprise a core and a cladding for propagating an optical wave; and periodic electrodes for inducing a quasi-phase matching, wherein a width w of the periodic electrode is shorter than ½ of a quasi-phase matching period.

According to still another aspect of the present invention, a method of determining an quasi-phase matching efficiency in an periodically poled structure of an optical waveguide having poled electrodes for inducing a quasi-phase matching is provided, the method comprising a step of calculating an electric field applied to the electrodes on the basis of the periodically poled structure, a width of the periodic electrodes, a distance between the electrodes, and a voltage applied to the electrodes; and a step of defining a mean distribution of non-linear optical coefficients from a distribution of the non-linear optical coefficients induced from the calculated electric field, thereby determining the quasi-phase matching efficiency.

On the other hand, the distribution of the non-linear optical coefficients may be proportional to a strength distribution of the electric field formed in the optical waveguide.

On the other hand, the distance between the electrodes and the width of the periodic electrode may be determined such that the quasi-phase matching efficiency falls within a range of 10% of the maximum value to the maximum value in the quasi-phase matching efficiency distribution of the non-linear optical coefficients depending on the distance between the electrodes and the width of the periodic electrodes.

Inspecting one of differences between the present invention and the conventional art, a width w of a periodic electrode is matched to the coherence length Lc in the conventional periodically poled structure, that is, w=Lc, but in the present invention, a width w of a periodic electrode satisfies a condition of 0<w<coherence length Lc. Therefore, in the present invention, it is possible to increase the quasi-phase matching efficiency on the basis of variation of the electrode width w, and to maximize a conversion efficiency of a non-linear optical phenomenon by determining the optimized electrode width w.

BRIEF DESCRIPTION OF THE DRAWINGS

The above and other objects, advantages and features of the present invention will become apparent from the following description of preferred embodiments given in conjunction with accompanying drawings, in which.

DETAILED DESCRIPTION OF PREFERRED EMBODIMENTS

Figure 1:
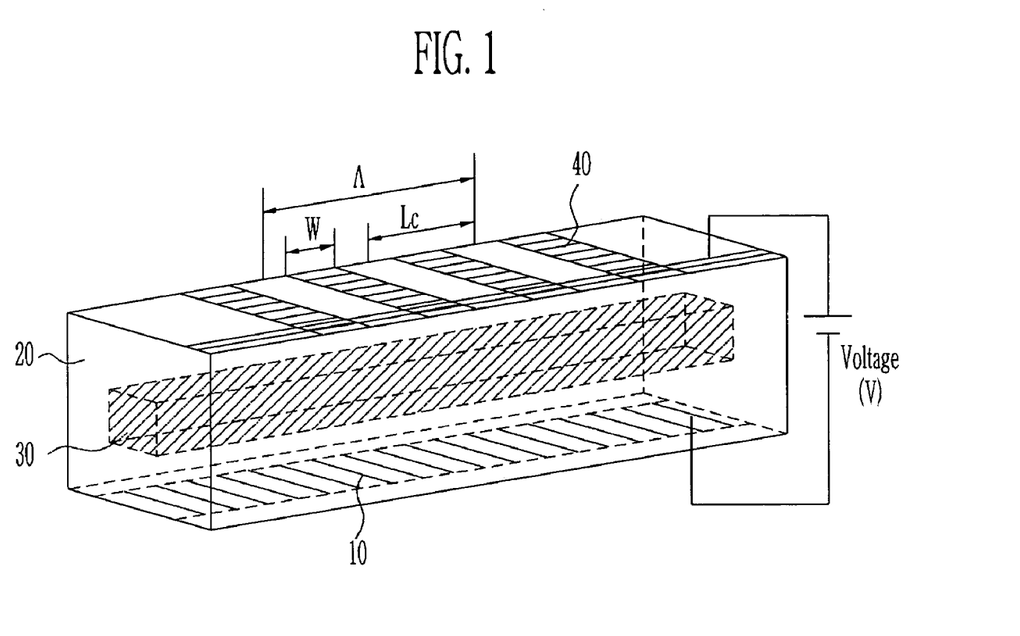
FIG. 1 is a schematic view showing a structure of an optical waveguide having a periodically poled structure according to an embodiment of the present invention.

Now, a periodically poled structure of an optical waveguide according to the preferred embodiments of the present invention will be described in detail with reference to the appended drawings. FIG. 1 is a schematic view showing an example of the periodically poled structure of the optical waveguide according to an embodiment of the present invention.

In FIG. 1, the optical waveguide comprises a core 30 made of material such as silica, semiconductor, polymer, a cladding 20, upper electrodes 40 and lower electrodes 10. A predetermined voltage difference is applied between the upper electrodes 40 and the lower electrodes 10. The upper electrodes 40 comprise periodically positioned electrodes (hereinafter, referred to as periodic electrodes), and the lower electrodes 10 comprise a flat electrode.

Referring to FIG. 1, a quasi-phase matching period, which depends on an optical wave propagated in the core and an effective refractive index of the optical wave, is indicated by $\Lambda$, and a coherence length is defined to be ½ of the quasi-phase matching period (2 Lc≡$\Lambda$). In addition, the periodic electrodes 40 of width w are brought into contact with one surface of the cladding, and the flat electrode 10 (or periodic electrode) is brought into contact with an opposite surface of the cladding to apply voltage thereto so that a periodic electric field is applied to the core. In addition, the electrode width w is smaller than the coherence length Lc (0<w<coherence length Lc). In this case, it is possible to maximize a conversion efficiency of non-linear optical phenomena by determining the electrode width of the periodic electrode optimally.

Next, a method of manufacturing the optical waveguide having a periodically poled structure will be described. First, in the method of manufacturing the optical waveguide, processes are more or less different each other depending on the corresponding materials, but a method of laminating layers from lower side can be generally used. In more detail, electrodes are deposited on a flat substrate such as a silicon wafer and then a lower cladding material is deposited thereon. A material to form the core is laminated on the lower cladding material and some region is removed so that only a given core region remains using a method such as dry-etching or the like, and then an upper cladding material is deposited thereon. Next, the periodic electrode material is laminated on the upper cladding material and patterned to form the periodic electrodes, and a voltage level is applied to the electrodes to induce a periodically second order non-linearity for the quasi-phase matching in the core.

Referring to the attached drawings, a poling structure will be classified by electrode structures on both surfaces of cladding. Variation of the quasi-phase matching efficiency will be analyzed depending on electrode width in each poling structure.

FIGS. 2A to 2D are schematic views showing an optical waveguide with electrodes. Each poling structure is classified by arrangement of the periodic electrodes. The coordinates x, y, z are the directions of light propagation along the center of core, a width direction of an electrode, and a direction in which the electric field is applied, respectively.

For the convenience of explanation, it is assumed that the origin of the coordinate system is placed in the middle of two arbitrary parts of the nearest neighbors that makes a quasi-phase matching period $\Lambda$=2 Lc to be determined by an optical wave and a condition of a medium. Accordingly, the centers of two pairs of periodic electrodes are placed at x=±Lc/2 to be symmetric with respect to the origin. In addition, the whole structure of the periodic electrodes is a simple repetition of the single period. Due to a translation symmetry of the electrode structure, any interval can be taken without loss of any generality.

In poling, the electric field is applied to the medium comprising dielectric layers including a large number of atoms or molecules in general. The macroscopic properties of the dielectric materials responding to the applied electric field are known to be described by the electrostatic limit of Maxwell's equations.

Assuming that the z-axis passes through the center of a pair of periodic electrodes, the distribution of the electric field due to the pair of periodic electrodes with an electrode width w can be represented by a following equation 1:

$$E_b(x, w, d) \equiv \begin{cases} \dfrac{dE_Q}{2x-w+d}, & x \geq \dfrac{w}{2} \\ E_Q, & |x| \leq \dfrac{w}{2} \\ \dfrac{dE_Q}{-2x-w+d}, & x < -\dfrac{w}{2} \end{cases} \quad (1)$$

In other word, it means that the distribution value of the electric field between the electrodes ($|x| \leq w/2$) is a constant $E_Q$, but drop downs a half value $E_Q/2$ of the maximum value at $|x|=w/2+d/2$, and is rapidly decreased by $\sim 1/|x|$ in a region ($|x| \geq w/2$) outside the electrodes. Here, the finite constant $E_Q$ indicates that the magnitude of electric field remains constant irrespective of scale change of the width w and the separation distance d between the electrodes.

The electric field due to a pair of periodic electrodes at any position on the x axis can be easily obtained by shifting in parallel the distribution of the electric field mentioned above, and the distributions of the electric fields in other poled structures to be described later can be obtained on the basis of the electric field.

First Embodiment

Figure 2A:
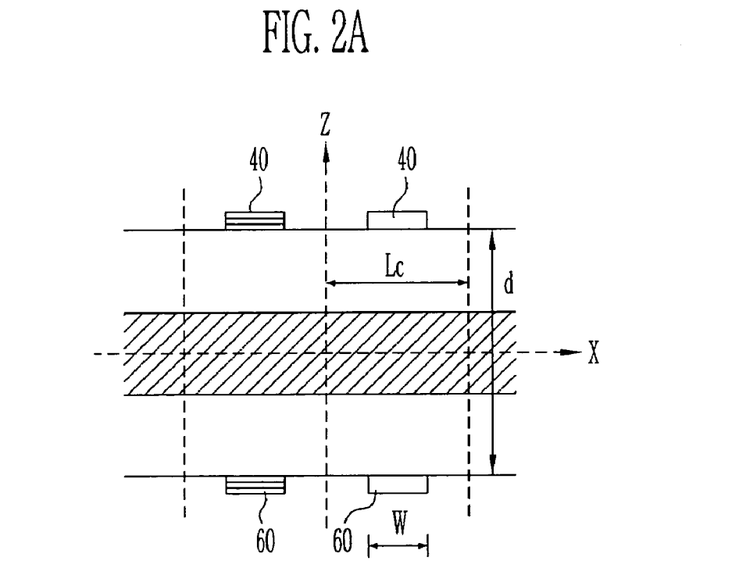
FIGS. 2A to 2D are schematic views showing surfaces of the optical waveguide, representing the periodically poled structures according to first to fourth embodiments of the present invention, respectively.

FIG. 2A is a schematic view showing the periodically poled structure of the optical waveguide according to the first embodiment of the present invention. The period electrodes 40, 60 are arranged at an interval of coherence lengths Lc by every two pairs on both surfaces of the optical waveguide, where each pair of periodic electrodes are spaced by the distance d between electrodes which is a sum of the thickness of the core and the cladding. The electrode width w satisfies 0<w<Lc.

FIG. 2A is a view showing the poling structure in which electric fields of opposite direction are applied to each pair of the periodic electrodes. Assuming that an electrical interaction is not generated between the periodic electrodes in each pair, the distribution of the electric field due to the two pairs of the periodic electrodes can be represented by linear combination of the electric fields due to each pair of the periodic electrodes. Since the pulse poling structure for alternately applying the opposite voltage at a time interval to each pair electrodes, the poling efficiency in optical waveguide is the same as the linear combination of the actual electric field.

The pulse poling structure is disclosed in *App. Phys. Lett.*, vol. 74, pp. 3420–3421, 1998, entitled "1000 V/µm pulsed poling technique for photolime-gel electro-optic polymer with room-temperature repoling feature" written by Z. Z. Yue, D. An, and R. T. Chen, and is referenced here.

At that time, the generated electric field can be represented by an equation 2 as follows:

$$E_0^I(x, w, d) = E_b\left(x - \frac{Lc}{2}, w, d\right) - E_b\left(-x - \frac{Lc}{2}, w, d\right). \quad (2)$$

According to the equation 2, the electric field is distributed in the symmetric with respect to the origin, and the electric field due to two pairs of the periodic electrodes within x=nΛ(n=0, ±1, ±2, . . . ) period which is a $n^{th}$ period can be represented by an equation 3 by shifting in parallel the distribution function, as follows:

$$E_n^I(x, w, d) = E_b\left(x - n\Lambda - \frac{Lc}{2}, w, d\right) - E_b\left(-x + n\Lambda - \frac{Lc}{2}, w, d\right). \quad (3)$$

On the other hand, when an electric field is applied to the whole optical waveguide, the electric field of $E_n^I(x,w,d)$ is generated by the electrodes of the $n^{th}$ periodic area. Furthermore, the whole electric field generated in −Lc≤x≤Lc area can be obtained by linearly combining the values of −Lc≤x≤Lc area of the electric fields generated in $E_0^I(x,w,d)$ and $E_n^I(x,w,d)$. Specifically calculating the whole electric field, the whole electric field is represented by an equation 4 as follows:

$$E_t^I(x, w, d) = E_0^I(x, w, d) + \quad (4)$$
$$\sum_{n=1}^{n_R} \left[ \frac{dE_Q}{-2(x-n\Lambda)+Lc-w+d} - \frac{dE_Q}{-2(x-n\Lambda)-Lc-w+d} + \frac{dE_Q}{2(x-n\Lambda)-Lc-w+d} - \frac{dE_Q}{2(x-n\Lambda)+Lc-w+d} \right].$$

Where, $n_R$ is determined by considering contributions owing to adjacent left and right periods. Furthermore, calculating the magnitude of electric field from the two pairs of the electrodes to the electric field of the adjacent period, the electric field $E_0^I(x=Lc+3\Lambda,w,d)$ in the end portion of the third period becomes very small in the order of $E_0^I(x=Lc+3\Lambda,w,d)/E_Q \sim 1\%$ in comparison with the maximum value. Therefore, $n_R \approx 3$ considering only up to the third period is good approximation in the actual calculation.

Generally, an electric field induces poling effect on depending on the characteristics of materials. However, if the non-linear coefficient is proportional to the applied magnitude of electric field similarly to the general material (referring to *Jpn. J. Appl. Phys.*, vol. 30, pp. 320–326, 1991, entitled "Electro-optic light modulation in poled azo-dye-substituted polymer waveguide", written by Y. Shuto, M. Amano and T. Kaino, and *Opt. Fib. Tech.*, vol. 5, pp. 235–241, 1999, entitled "Frozen-in electric field in thermally poled fibers", written by D. Wong, W. Xu, S. Fleming, M. Janos, and K. M. Lo), then it can be understood that the distribution of a second order non-linear coefficient $d_2(x,w,d)$ is determined on the basis of the distribution of the electric field in the optical waveguide to be $d_2(x,w,d)\tilde{}E(x,w,d)$.

On the other hand, since the distribution of the non-linear coefficient is determined by the distribution of the poling electric field, useful contribution with respect to the second order non-linear condition of the distribution of electric field can be calculated. The mean distribution of the quasi-phase voltage of the secondary non-linear coefficient $d_2(x,w,d)$ can be defined within one period by an equation 5 as follows:

$$\langle d_2(w, d)\rangle \equiv \frac{1}{2Lc}\left[\int_0^{Lc} d_2(x, w, d)dx - \int_{-Lc}^0 d_2(x, w, d)dx\right], \quad (5)$$

where $\langle d_2(w,d)\rangle/d_Q$ due to the mean distribution $\langle d_2(w,d)\rangle$ can be interpreted as a quasi-phase matching efficiency. In other words, if the flat poling without the periodic poling, then $\langle d_2(w,d)\rangle/d_Q=0$, if the perfect quasi-phase matching and $0 \le x \le Lc$, then $\langle d_2(x,w,d)\rangle=d_Q$, and if $-Lc \le x \le 0$, then $\langle d_2(x,w,d)\rangle=-d_Q$, therefore, the mean distribution of the perfect phase matching on the basis of the definition mentioned above is $\langle d_2(x,w,d)\rangle=d_Q$, and the quasi-phase matching efficiency $\langle d_2(w,d)\rangle/d_Q$ becomes 1, that is, 100%.

As described above, the characteristic of the mean distribution $\langle d_2(w,d)\rangle$ of an induced poling coefficient can be calculated by the mean distribution $\langle E_t^I(w,d)\rangle$ of the whole electric field $E_t^I(x,w,d)$ of the inner portion in the optical waveguide. According to this definition, the quasi-phase matching efficiency of the induced non-linear coefficient can be obtained by calculating the mean distribution of the electric field strength. Therefore, calculating the mean distribution of the whole electric field according to the first embodiment, an equation 6 can be represented as follows:

$$\langle E_t^I(w, d)\rangle = E_Q \cdot \left[\frac{w}{Lc} + \frac{1}{2} \cdot \frac{d}{Lc}\ln\frac{(Lc - w + d)^3}{(3Lc - w + d)d^2}\right] + \frac{E_Q}{2} \cdot \frac{d}{Lc} \sum_{n=1}^{N_n} \ln\frac{[(4n-3)Lc - w + d][(4n+1)Lc - w + d]^3}{[(4n-1)Lc - w + d]^3[(4n+3)Lc - w + d]}. \quad (6)$$

The sum of adjacent periods represented in a second term thereof is rapidly converged with respect to $n_R$.

Now, referring to FIGS. 3A to 3C, behavior of $\langle E_t^I(w,d)\rangle/E_Q$ with respect to the increment in $n_R$ will be described.

Figure 3A:
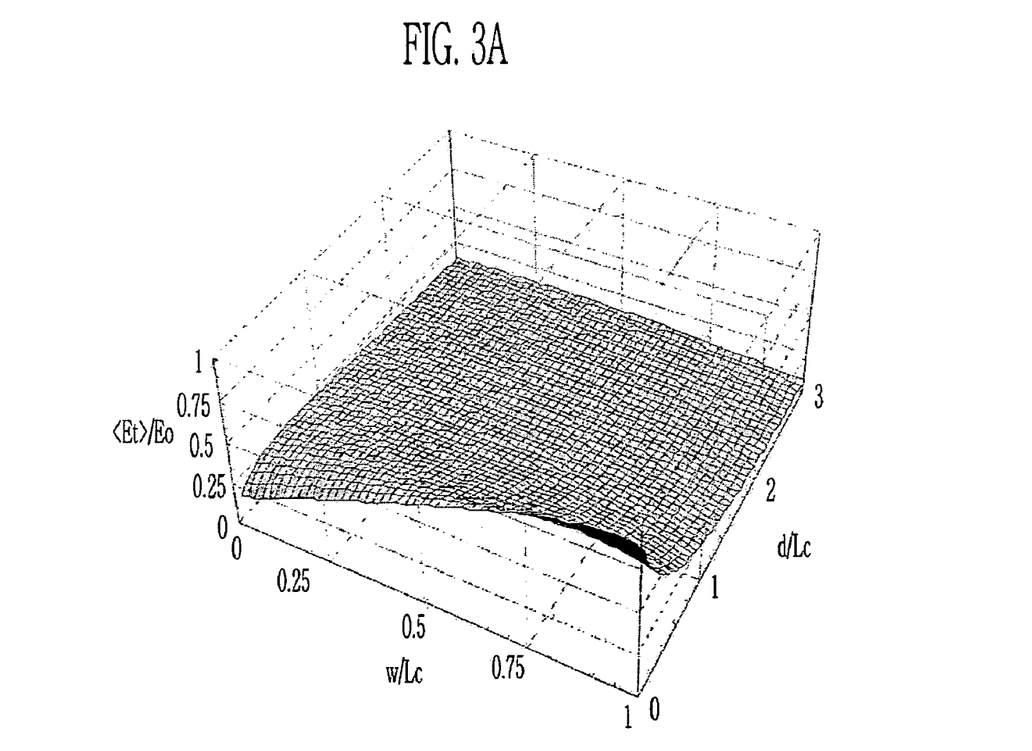
FIGS. 3A to 3C are graphs showing a mean distribution behavior of an electric field with increment in $n_R$ according to the first embodiment of the present invention.

FIG. 3A is a view showing the efficiency distribution $\langle E_t^I(w,d)\rangle/E_Q$ of the magnitude of electric field in the form of a three-dimension distribution chart in the case that n=3 with respect to $0<w/Lc \le 1$ and $0<d/Lc \le 3$.

As described above, since the induced none-linear coefficient is determined by the distribution of the magnitude of electric field, $\langle d_2(w,d)\rangle/d_Q \approx \langle E_t^I(w,d)\rangle/E_Q$, and it is therefore noted that FIG. 3A is showing the quasi-phase matching efficiency which is a standard non-linear coefficient $\langle d_2(w, d)\rangle/d_Q$ as functions of two non-dimension variations of a standard width w/Lc of the electrode and a distance d/Lc between the electrodes.

Figure 3B:
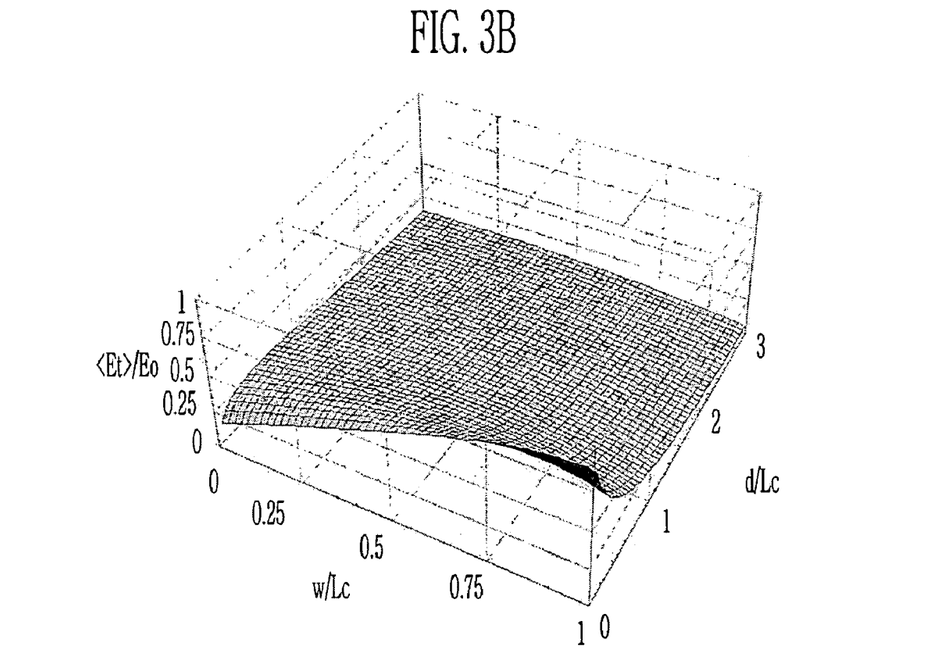

FIG. 3B is a view showing the case that $n_R=10$ in FIG. 3A. In the FIG. 3B, the behavior of $\langle E_t^I(w,d)\rangle/E_Q$ is greatly changed depending on variation of $n_R$.

Figure 3C:
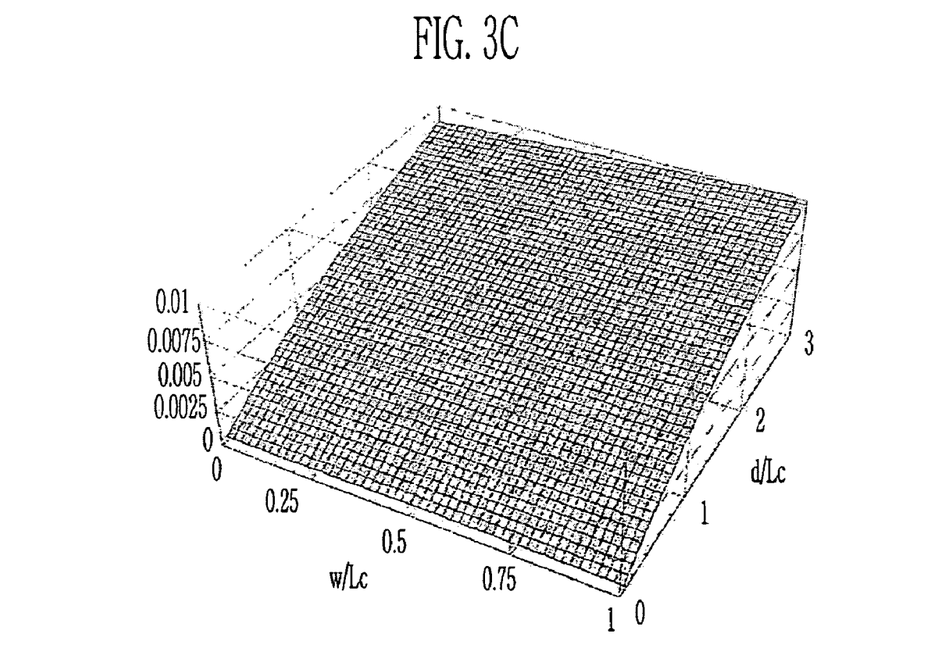

FIG. 3C is a view specifically showing a practical difference $\langle E_t^I(w,d,n_R=3)\rangle/E_Q - \langle E_t^I(w,d,n_R=10)\rangle/E_Q$ according to variation of $n_R$ in FIG. 3A and FIG. 3B. In FIG. 3C, the difference is less than about 1% in the given example area, and a contribution of the adjacent period is rapidly converged, therefore, it is preferable that $n_R=3$.

Figure 4A:
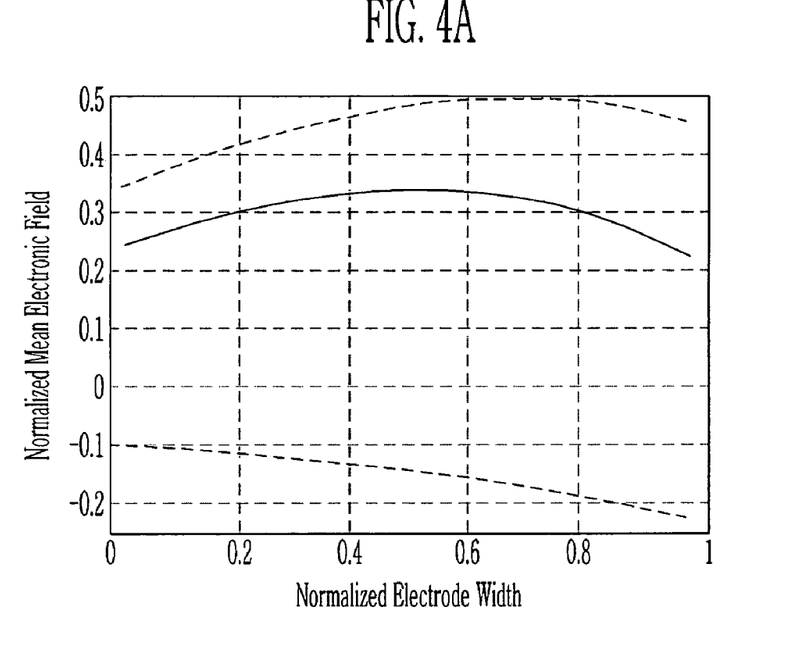
FIGS. 4A and 4B are graphs showing a mean distribution chart in a case of d/Lc=1 and a case of variation of d/Lc according to the first embodiment of the present invention.
Figure 4B:
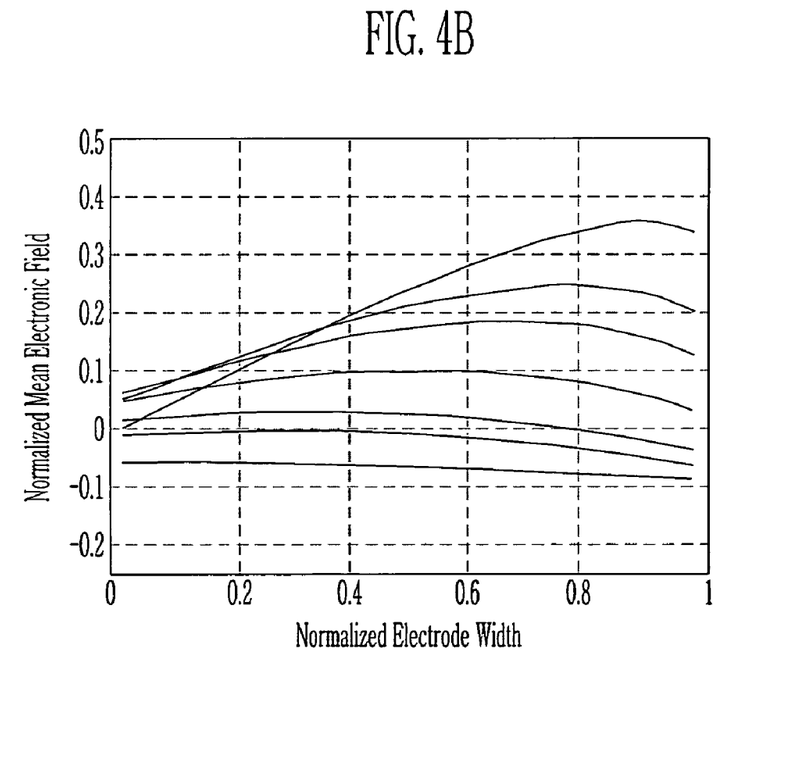

Next, in order to specifically look into the variation of the quasi-phase matching efficiency in more detail, the efficiency distribution chart of the electric field when d/Lc=1 and the mean efficiency distribution chart of the electric field depending on the variation of d/Lc are shown in FIGS. 4A and 4B, respectively.

In FIG. 4A, a solid line represents a two-dimension curve in the case of d≈10 μm, Lc=≈10 μm, and (d/Lc)=1 which are mainly corresponding to the optical waveguide made of polymer or the like in three-dimension efficiency distribution of FIG. 3. In other words, a broken line in the figure indicates a first term in $\langle E_t^I(w,d)\rangle/E_Q$, a dash line indicates a second term thereof, and a solid line represents the sum of two terms mentioned above. The solid line of the two-dimension figure represents that as w/Lc gets to be decreased from 1, the whole efficiency is increased up to have a maximum value and then decreased. The maximum value of the efficiency of the whole electric field is $\langle E_t^I(w,d)\rangle_{max}/E_Q \approx 0.34$ in the case of $w_{max}/Lc \approx 0.53$ under the first periodically poled structure. As such a numeral result, for example, the optimum periodic electrode width w for the maximum of the quasi-phase matching efficiency is about 53% of the coherence length, and the maximum value of the efficiency of the induced non-linear coefficient is about 34% of the case of perfect phase matching. Accordingly, when the quasi-phase matching efficiency is not less than 0.3, generally, the periodic electrode width is from 0.2 to 0.8 Lc. On the other hand, it is understood that in the case of optical waveguide (more specifically, polymer optical waveguide), the periodic electrode width has a maximum value at 0.5 Lc when (d/Lc)=1.

FIG. 4B is a view showing $\langle E_t^I(w,d)\rangle/E_Q$ as a variation of w/Lc on the basis of variation of d/Lc value, and showing the cases of (d/Lc)=0.1, 0.3, 0.5, 1.0, 2.0, 3.0, 10.0 from the right side upper portion thereof. Looking into the behaviors of the distributions, the more increased the d/Lc value is, the more decreased the value in the case of (w/Lc)=1 is. Furthermore, as decreased in the value of w/Lc from 1, each behavior is increased up to a maximum point and then is decreased. The more decreased the value of w/Lc having a maximum point is, the more increased the value of d/Lc is. On the other hand, the case that the quasi-phase matching efficiency is not less than 0.3 and the periodic electrode width is from 0.2 to 0.8 Lc is corresponding to the case that d/Lc is 0.5, 1.0, 2.0, 3.0, or 10.0. The periodic electrode width and the distance between the electrodes can be controlled so that the quasi-phase matching efficiency of the non-linear optical coefficient with respect to w/Lc on the basis of each d/Lc is within range between the maximum value and 10% of the maximum value. In the range, it is possible to ensure the preferred quasi-phase matching efficiency. For example, the maximum value of the coefficient of the non-linear coefficient induced from (d/Lc)=1 is on the order of 0.34. In this case, it is possible to ensure that the preferred quasi-phase matching efficiency is from 0.034 to 0.34. The periodic electrode width and the distance between the electrodes can be controlled so that such a condition is satisfied.

Figure 5A:
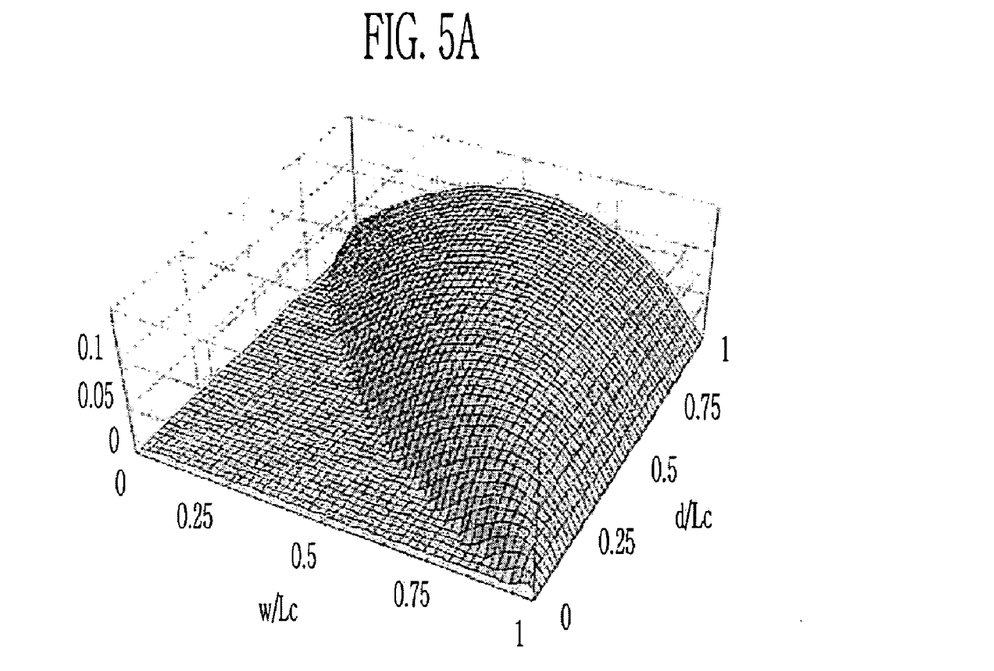
FIGS. 5A to 5C are graphs showing a region in which a mean distribution value of the electric field in FIG. 3A is lager than that in the case of w/Lc=1.
Figure 5B:
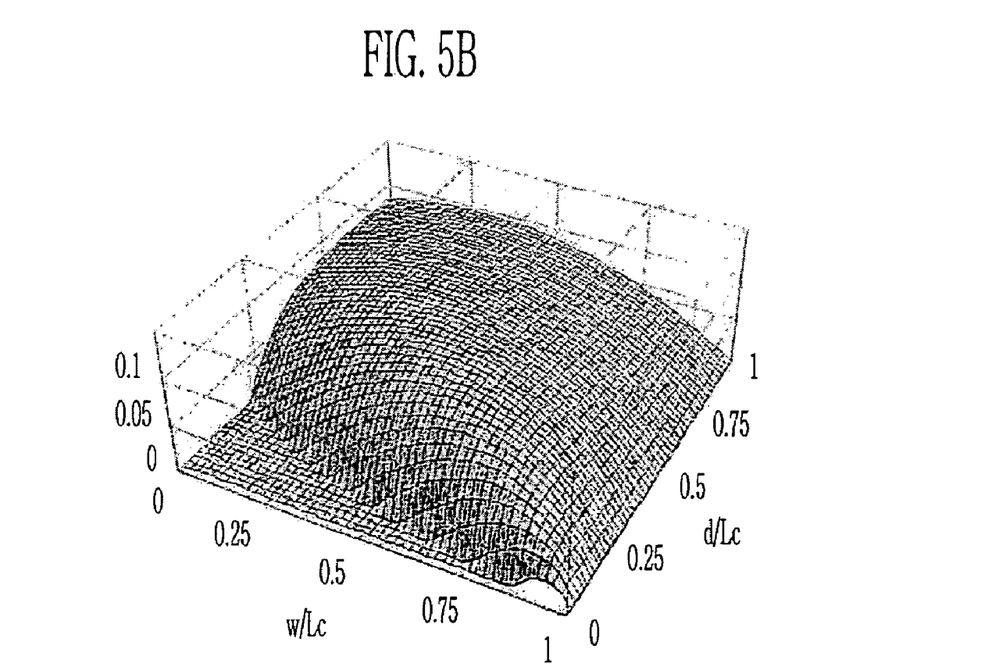
Figure 5C:
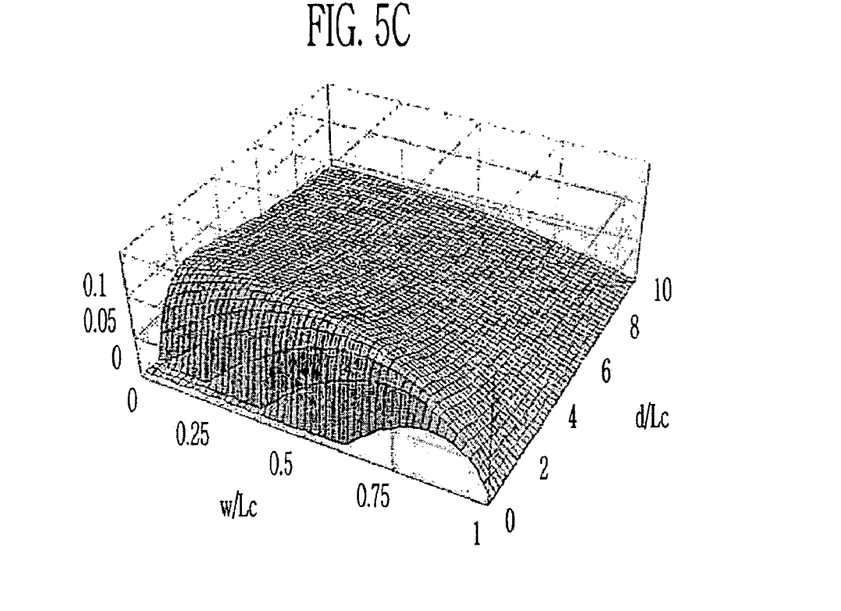

FIGS. 5A, 5B and 5C are graphs showing the area in which the mean distribution of the electric field in FIG. 3A is lager than that at w/Lc=1. FIGS. 5a, 5b, and 5c are graphs showing the mean distributions of the electric fields when the rages of d/Lc are from 0 to 1, from 1 to 3, and from 0 to 10, respectively. As shown in FIGS. 5A, 5B, and 5C, in the case of 0<(d/Lc), there are areas of the electrode width where the phase matching efficiency is increased in comparison with the case of w/Lc=1 when the electrode width is shorter than the coherence length with respect to each d/Lc, or there is a maximum value making the efficiency of the area maximize.

On the other hand, with respect to a problem of being discharged between adjacent electrodes, it is possible to avoid the problem using a structure of turning a pulse pole on/off, and the poling effect remained in the optical waveguide is the same as the linear combination of the real electric field.

Second Embodiment

Figure 2B:
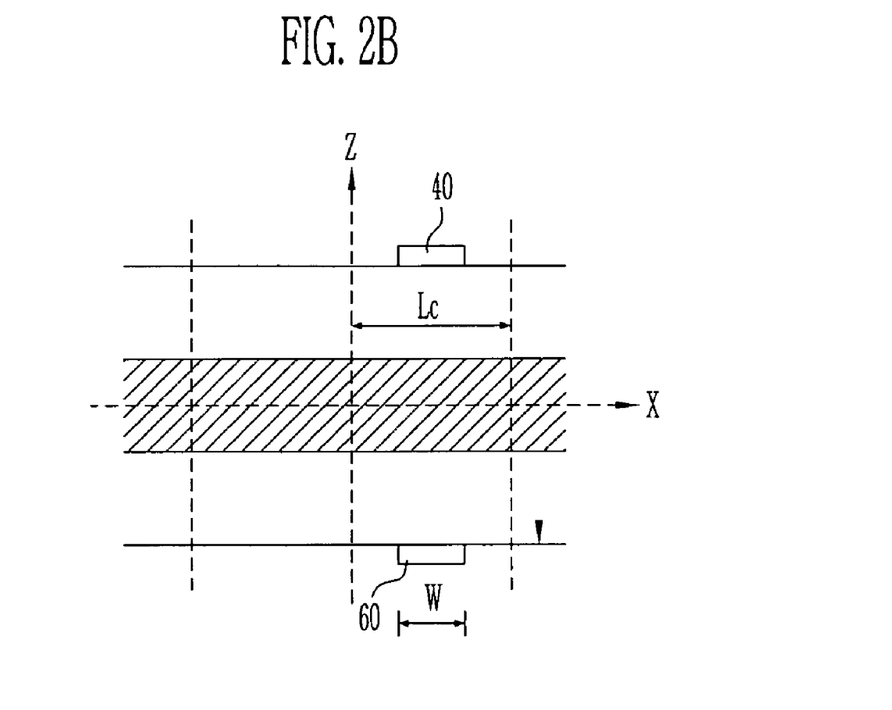

FIG. 2B is a view schematically showing the periodically poled structure of the optical waveguide according to the second embodiment of the present invention. In this structure, the periodic electrodes 40, 60 are arranged at an interval of 2 Lc at both sides of the optical waveguide. Due to the translation symmetric of the electrode structure, the origin of the coordinates system is placed on a center of one period to have a center of a pair electrodes at a place of x=Lc/2. Accordingly, if a DC voltage is applied to the electrode paced at 0≦x≦Lc, then the electric field of one pattern is generated. The mainly different point in comparison with the first embodiment is that in the case of the poling state, one pair of electrodes does not exist every period, and a normalized DC poling instead of the pulse poling can be used. The mean distribution of the periodically poled structure according to the second embodiment is calculated on the basis of the basis electric field similarly to the first embodiment. In the same method as the first embodiment, by shifting in parallel the distribution function of the basis electric field, the distribution of the electric field in an nth period is represented by an equation 7 as follows:

$$E_n^{II}(x, w, d) = E_b\left(x - n\Lambda - \frac{Lc}{2}, w, d\right), \quad (7)$$

and the whole electric field can be obtained by an equation 8 as follows:

$$E_t^{II}(x, w, d) = E_0^{II}(x, w, d) + \sum_{n=1}^{n_g}\left[\frac{dE_Q}{-2x + (4n+1)Lc - w + d} + \frac{dE_Q}{2x + (4n-)Lc - w + d}\right]. \quad (8)$$

On the other hand, when the mean distribution of the whole electric field is calculated by the defined equation aforementioned above, as a result of the calculation, an equation 9 is obtained as follows:

$$<E_t^{II}(w, d)> = \frac{<E_t^I(w, d)>}{2}, \quad (9)$$

where, $<E_t^I(w,d)>$ is apparently induced in the first embodiment. The equation 9 shows that the mean distribution of the second embodiment is ½ of the mean distribution of the second embodiment. Physically, as a result of the inducing, it is sure that the electrode structure of the first embodiment is combined with the same a geometry structure as two electrodes of the second embodiment to improving the efficiency thereof so as to obtain the optimum efficiency. Similarly, the efficiency distribution of the second embodiment becomes $<E_t^I(w,d)>_{max}/E_Q \approx 0.17$ in the case of the optimum length of the electrode given when d/Lc=1 in the first embodiment.

(Third Embodiment)

Figure 2C:
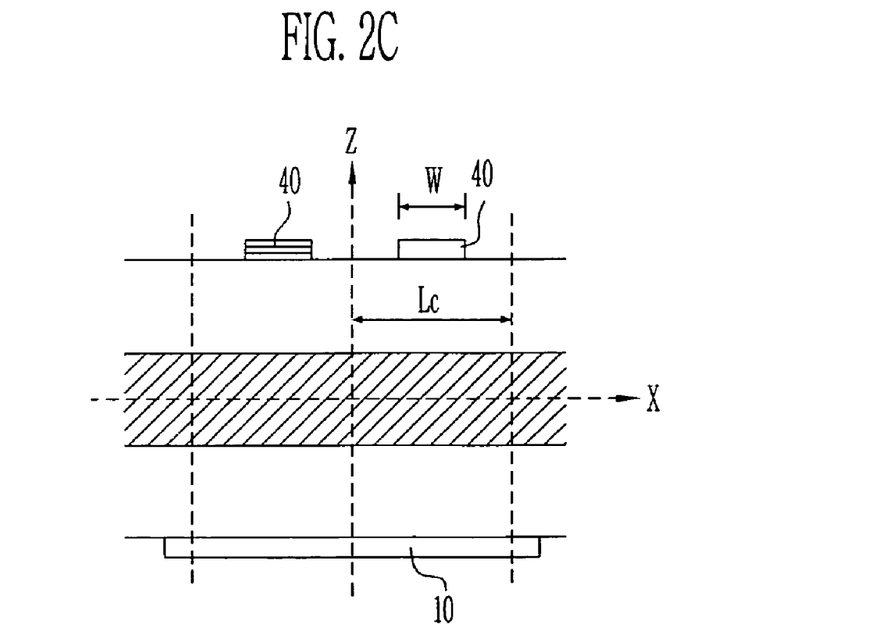

FIG. 2C is a view schematically showing the periodically poled structure of the optical waveguide according to the third embodiment of the present invention. On one surface of the optical waveguide, the period electrode 40 is arranged at an interval of Lc, and on the other surface of the optical waveguide, a long flat electrode 10 is arranged. The poling structure in the third embodiment is matched to the poled structure of the first embodiment with the exception the fact that a continuously flat electrode is employed instead of the series periodic electrode placed at one surface. In this structure, assuming that the basis electric field has a form of $E_b(x,w,2d)$, other calculations can be easily performed by using the case of d->2d instead of the result of the first embodiment. The distribution of the electric field in an nth period is represented as follows:

$$E_n^{III}(x, w, d) = E_b\left(x - n\Lambda - \frac{Lc}{2}, w, 2d\right) - E_b\left(-x + n\Lambda - \frac{Lc}{2}, w, 2d\right). \quad (10)$$

Accordingly, the whole electric field in one period with respect to an origin is represented as follows:

$$E_t^{III}(x,w,d) = E_t^I(x,w,2d) \quad (11)$$

Next, the mean distribution can be easily calculated. Using the relational equation in the first embodiment, $$<E_t^{III}(w,d)> = <E_t^I(w,2d)> \quad (12)$$

is obtained.

Now, referring to the FIGS. 6A to 6C, the behavior of $<E_t^{III}(w,d)>/E_Q$ with increment in $n_R$ will be described.

Figure 6A:
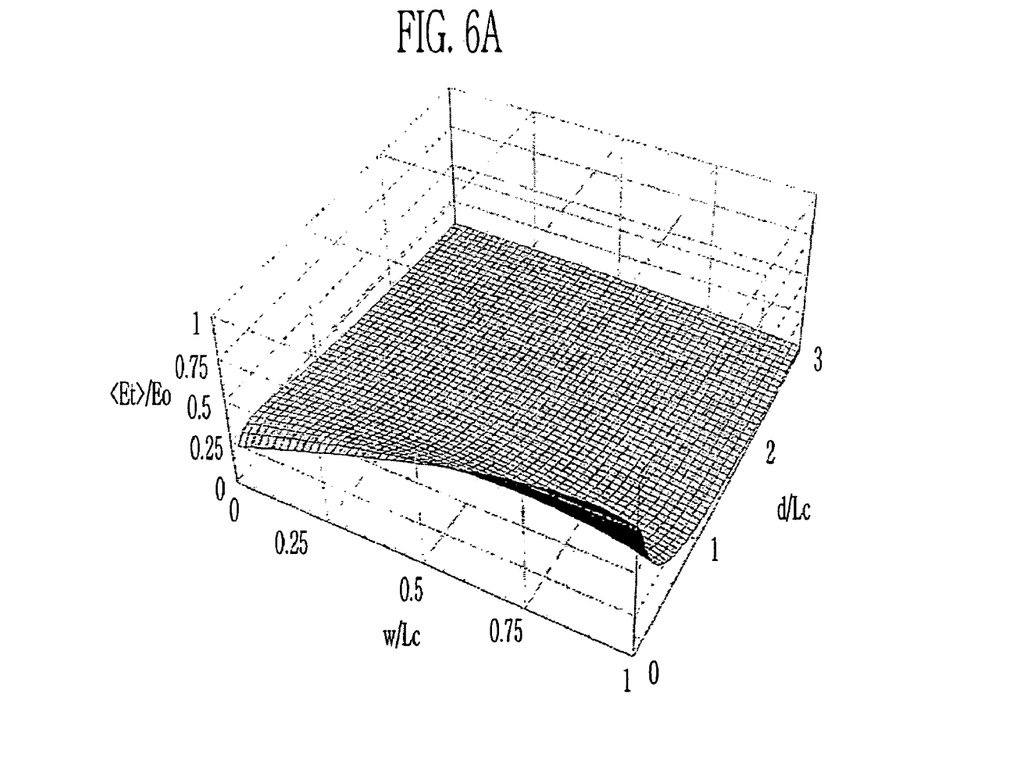
FIGS. 6A to 6C are graphs showing the mean distribution behavior of the electric field with increment in $n_R$ according to the third embodiment of the present invention.

FIG. 6A is an exemplary three dimension graph showing the efficiency distribution $<E_t^{III}(w,d)>/E_Q$ with respect to 0<(w/Lc)≦1 and 0<(d/Lc)≦3 area when $n_R$=3. As described above in FIG. 3A, since the induced non-linear coefficient is determined by the distribution of the electric field strength, it is noted that FIG. 6A shows the quasi-phase matching efficiency which is a normalized non-linear coefficient $<d_2(w,d)>/d_Q$ as functions of non-dimension values of an electrode width w/Lc and a distance between the electrodes d/Lc normalized by a coherence length.

Figure 6B:
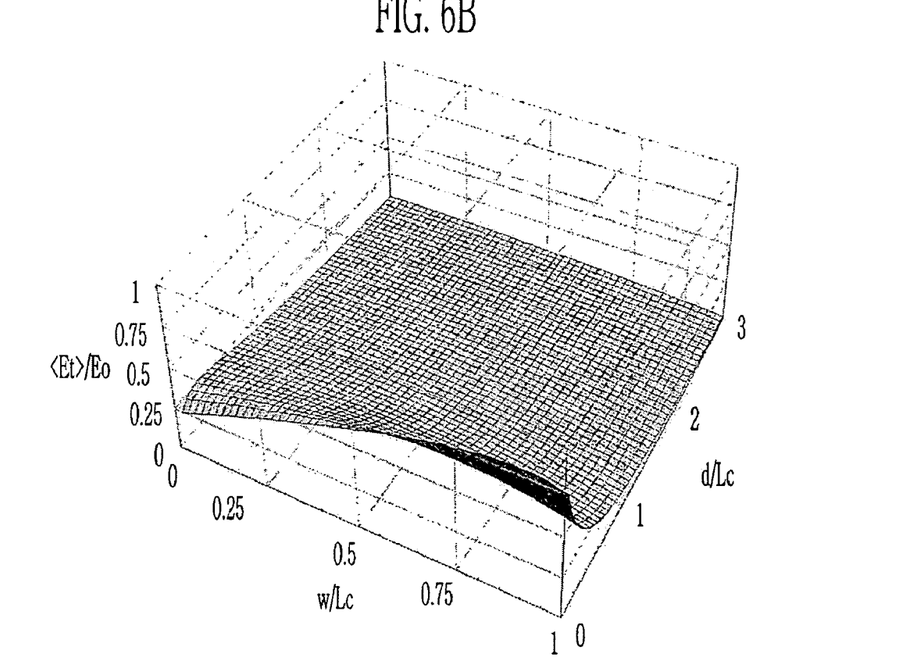
Figure 6C:
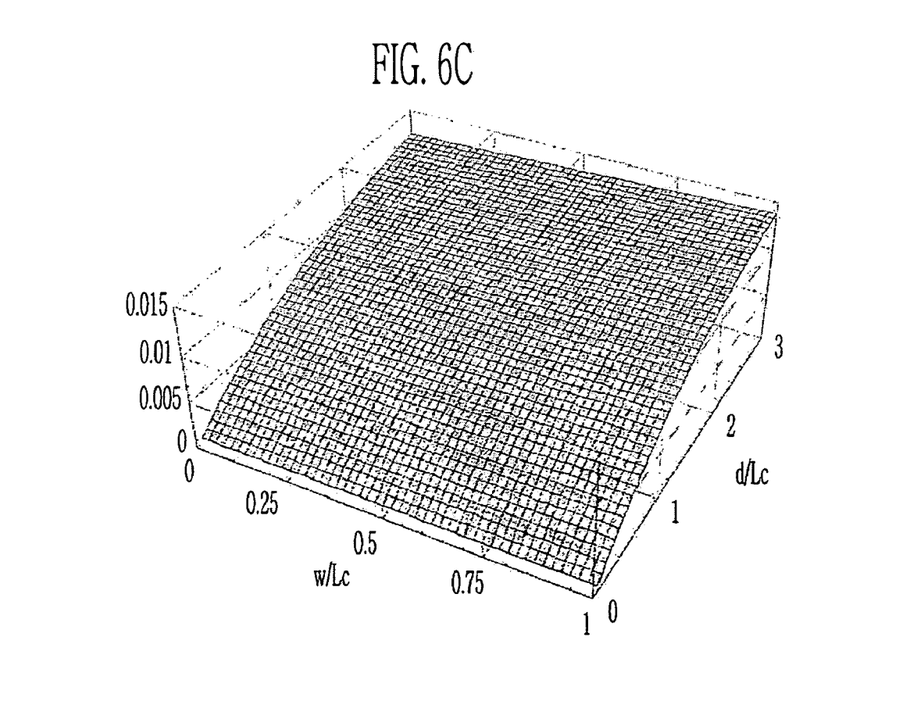

In FIG. 6B which is views showing FIG. 6A when $n_R$=10, it is noted that behaviors of $<E_t^{III}(w,d)>/E_Q$ in accordance with a changes of $n_R$ in FIGS. 6A and 6B are not largely different each other. FIG. 6C is a view schematically showing the real difference depending on variation of $n_R$, that is, $<E_t^{III}(w,d,n_R=3)>/E_Q - <E_t^{III}(w,d,n_R=10)>/E_Q$. In exemplarily given area, the difference is within about 1.5% and the order of contribution of the adjacent period is rapidly converged. In this case, it is understood that the case of $n_R \approx 3$ is preferable as described above.

Figure 7A:
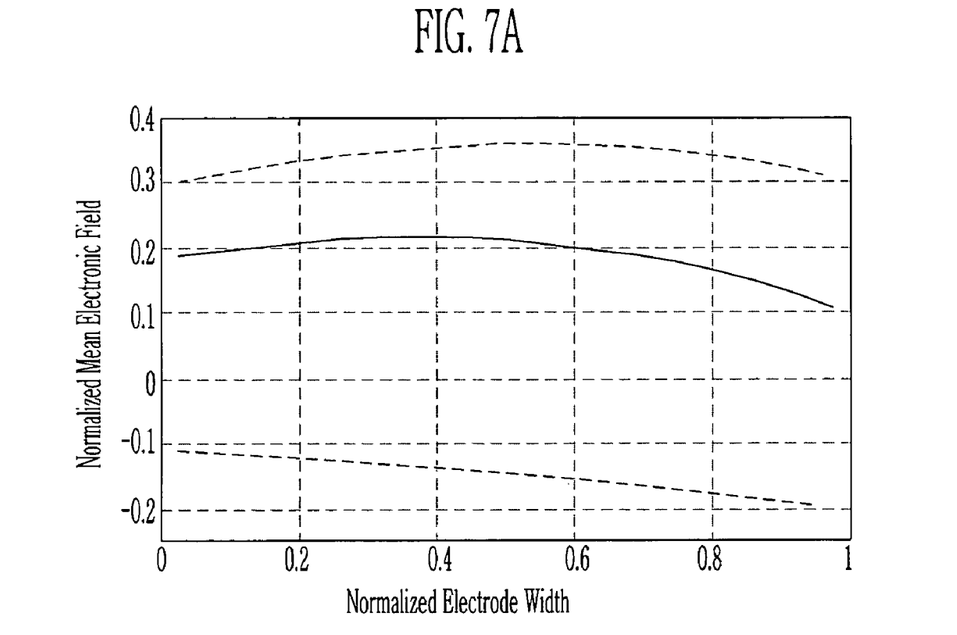
FIGS. 7A and 7B are graphs showing a mean distribution chart in a case of d/Lc=1 and a case of variation of d/Lc according to the third embodiment of the present invention.
Figure 7B:
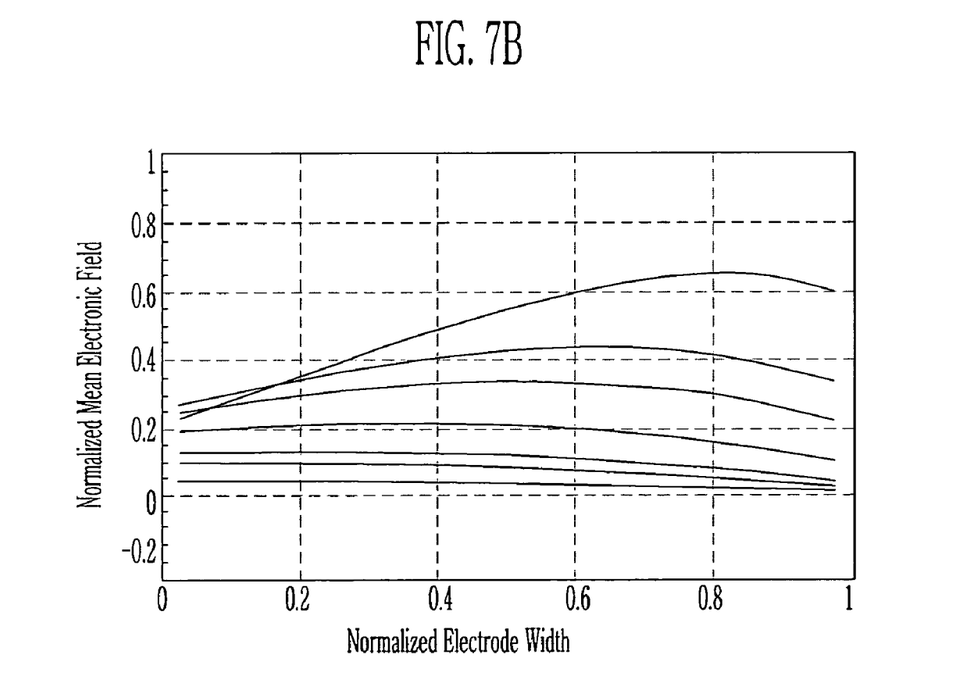

Next, in order to schematically inspect change of the quasi-phase matching efficiency, the efficiency distribution of the electric field when d/Lc=1 and the efficiency distribution of the electric field in accordance with change of d/Lc are showed in FIGS. 7A and 7B, respectively.

FIG. 7A is a view showing an example of two dimension graph when (d/Lc)=1 in the efficiency distribution of the three dimension in the FIG. 6A. In this figure, the dot line, the dash line, and the solid line represent the first term, the second term, and the sume of the aforementioned two in $<E_t^{III}(w,d)>/E_Q$, respectively. The FIG. 7A shows a behavior similarly to that of FIG. 4A, and that the maximum efficiency in the third periodically poled structure is $<E_t^{III}(w,d)>_{max}/E_Q \approx 0.22$ in the case of $(w_{max}/Lc) \approx 0.37$. According to the numeral resultant, fore example, the periodic electrode width for optimizing the maximum of the quasi-phase matching efficiency in the area of (d/Lc)=1 is about 37% of the coherence length, and the maximum value of the efficiency distribution of the induced non-linear coefficient is about 22% of the case of a perfect phase matching. When the quasi-phase matching efficiency is not less than 0.2, the periodic electrode width is about 0.1 to 0.6 Lc. On the other hand, it is found that the optical waveguide (specifically, polymer optical waveguide) has a maximum value in the case that the periodic electrode width is about 0.4 Lc when (d/Lc)=1.

Figure 8A:
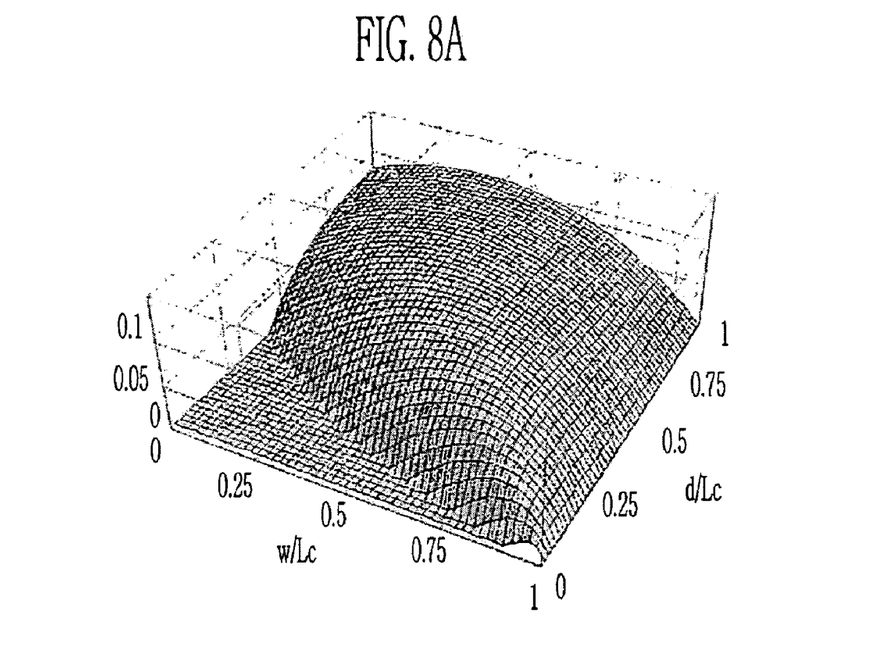
FIGS. 8A to 8C are graphs showing a region in which the mean distribution value of the electric field in FIG. 6A is lager than that in the case of w/Lc=1.
Figure 8B:
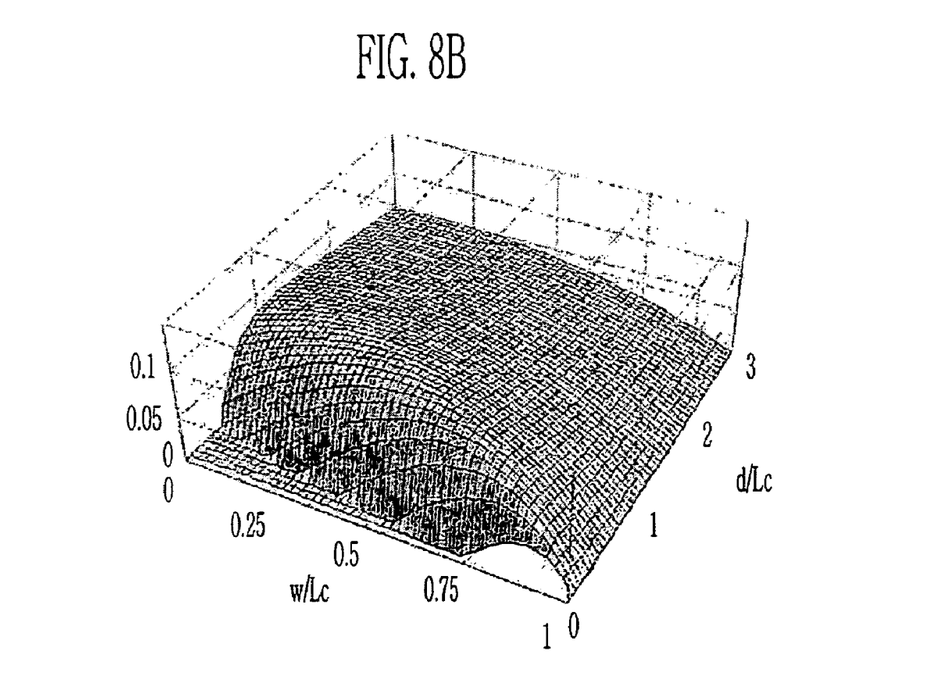
Figure 8C:
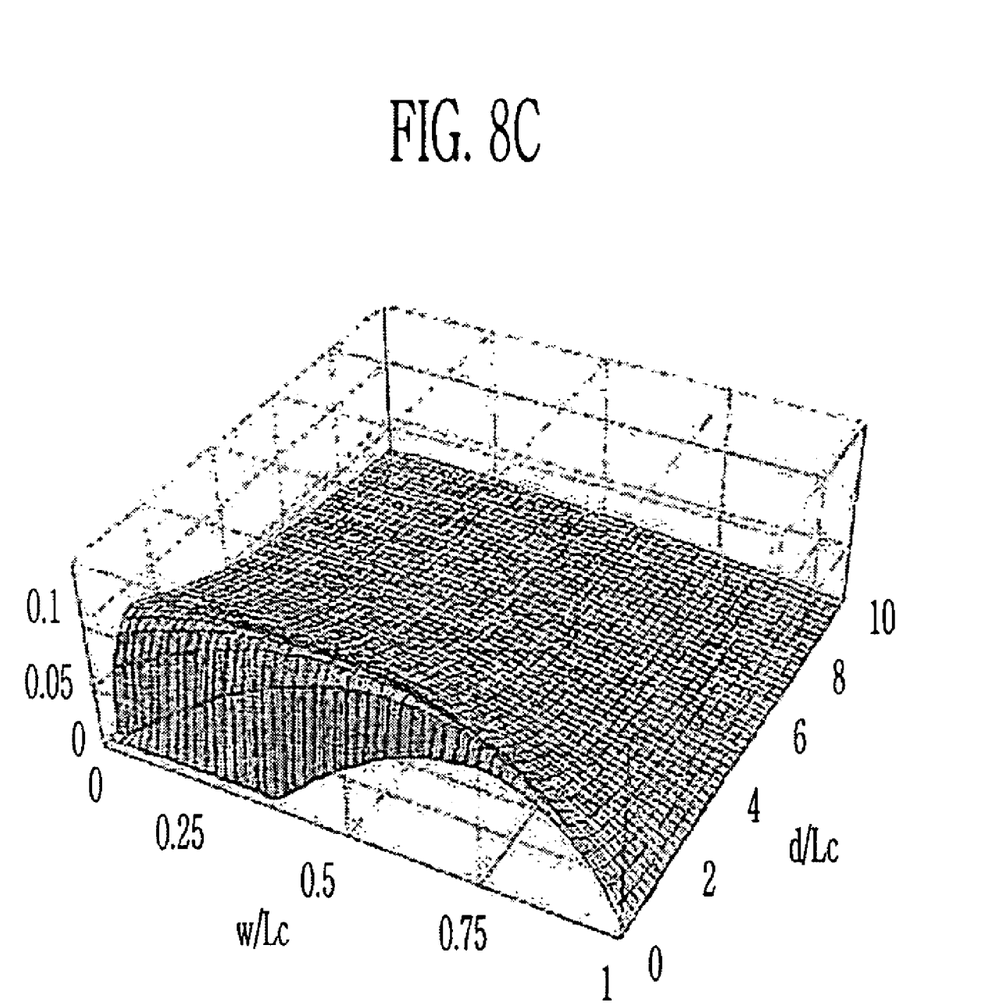

FIG. 7B shows a change of d/Lc value in the case of using $<E^{III}_t(w,d)>/E_O$ as a variation of w/Lc, and shows the case of (d/Lc)=0.1, 0.3, 0.5, 10, 2.0, 3.0, 10.0 from the right upper end in the figure. The whole behaviors of the distributions in FIG. 7B are similar to those of FIG. 4B. As shown in FIGS. 8A, 8B, and 8C, when the electrode width is shorter than the coherence length of each d/Lc at the time of 0<(d/Lc), there is an area having the electrode width to increase the quasi-phase matching efficiency in comparison with the case of (w/Lc)=1, and there is a maximum value enabling to maximize the efficiency in the area. FIGS. 8A, 8B, and 8C are graphs showing the efficiency distribution of the electric field when the range of d/Lc is 0 to 1, 0 to 3, or 0to 10.

(Forth Embodiment)

Figure 2D:
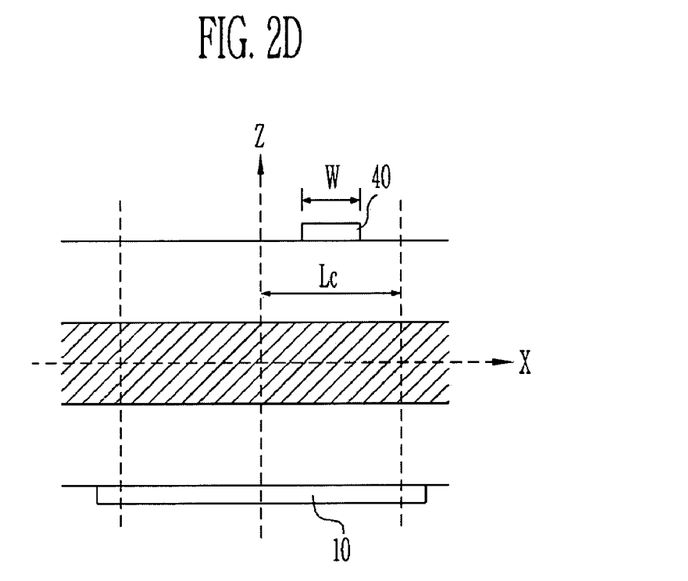

FIG. 2D is a view schematically showing the periodically poling structure of the optical waveguide according to the forth embodiment of the present invention. The electrical electrode 40 is arranged at an interval of 2 Lc on a surface of the optical waveguide, and the plate type electrode 10 is placed on another surface of the optical waveguide. This electrode structure is similar to the poling structure of the second embodiment when the flat electrode is placed instead of the series periodic electrode placed on one surface thereof, or similar to the poling structure of the third embodiment when one of the periodic electrodes is not in each period. Accordingly, the distribution of the $n^{th}$ electric field is represented by $$E^{IV}_n(x, w, d) = E_b\left(x - n\Lambda - \frac{Lc}{2}, w, 2d\right), \quad (13)$$

The whole electric field is represented by an equation $E^{IV}_t(x,w,d) = E^{II}_t(x,w,2d)$ induced from the second embodiment. In this equation which is completely similar to the equations of the aforementioned first and second embodiments, it is noted that the mean distribution of the forth embodiment is ½ of the mean distribution of the third embodiment. As induced from the second embodiment, the mean distribution of the quasi-phase matching can be also obtained by an equation as follows:

$$<E^{IV}_t(w,d)> = E^{II}_t(w,2d)>.$$

Therefore, the maximum of quasi-phase matching efficiency is $<E^{IV}_t(w,d)>_{max}/E_O \approx 0.11$ in the optimum width of the electrode similarly to the second embodiment.

The directly conventional poling is a part of the periodically poled structure of the forth embodiment, and is commonly used when w/Lc=1. Comparing to the case of d/Lc=1, the efficiency of this case is the result of $<E^{IV}_t(w,d)>_{max}/E_O \approx 0.05$. This means that about 5% of the induced coefficient contributes to a secondary non-linear optical in comparison with the perfect quasi-phase matching.

Comparing the periodically poled structure according to the present invention to the conventional poling, the conversion efficiency in the secondary non-linear optical light is proportional to $<d_2(w,d)>^2$. Therefore, it means that the efficiency can be increased by the factor of about $(0.34/0.05)^2 \sim 46.2$ of the maximum efficiency of the periodically poled structure of the first embodiment, the factor of about $(0.17/0.05)^2 \sim 11.6$ of the second embodiment, the factor of about $(0.22/0.05)^2 \sim 19.4$ of the third embodiment, and the factor of about $(0.11/0.05)^2 \sim 4.8$ of the poled structure of the forth embodiment by use of the shorten electrodes.

Accordingly, in the present invention, a new periodically poled technology of the periodic electrode having the shorten length for improving the quasi-phase matching efficiency has be developed. The present invention can be used to determine the most appropriate length for the periodic electrode in all non-linear processes to maximize the conversion efficiency.

The various change and modification of the present invention can be made without departing from the technical spirit and the scope of the present invention. Accordingly, it is intended that the aforementioned description for the implementation of the present invention be provided not for restricting the present invention limited by the appended claims and its equivalent but only for explaining the present invention.

As described above, in the present invention, it is possible to provide the periodically poled structure using the shorten electrode capable of obtaining the optimized quasi-phase matching efficiency using the optimized periodic electrode width when comparing to the conventional structure in the quasi-phase matching efficiency through a consistence interpretation in the physical view.

Furthermore, it is confirmed that although outlines of the poled structures are different each other, four types of the poling efficiencies are associated each other by analyzing the four types of the periodic poling schemes classified by the arrangement and combination of the periodic electrodes, and although the poling efficiency is changed on the basis of the characteristic of the waveguide in comparison with the perfect phase matching, it is possible to ensure about 34% of the perfect phase matching while about 5% of the perfect phase in the prior art in case that the distance between the electrodes has the same length as the coherence length by analyzing the four types of periodically poled structure.

Accordingly, in the present invention, it is possible to determine the periodic electrode having an optimized length for maximizing the second order non-linear conversion efficiency in the periodic poled process by use of the quasi-phase matching.

This application claims the benefit of Korean Patent Application No. 2003-47636 filed on Jul. 12, 2003, the disclosure of which is hereby incorporated herein by reference in its entirety.

What is claimed is:

1. A periodically poled structure of an optical waveguide having periodic electrodes for inducing a quasi-phase matching,
    wherein a width W of periodic electrodes is shorter than ½ of a quasi-phase matching period.

2. A periodically poled structure of an optical waveguide according to claim 1, wherein the optical waveguide comprises: a core and a cladding for propagating an optical wave; first periodic electrodes formed on one surface of the cladding; and second periodic electrodes formed on the other surface of the cladding, wherein widths w of the first and second electrodes are shorter than ½ of the quasi-phase matching period.

3. A periodically poled structure of an optical waveguide according to claim 2, wherein the first and second periodic electrodes are arranged at an interval of coherence length Lc every two pairs of the first and second electrodes.

4. A periodically poled structure of an optical waveguide according to claim 2, wherein a pulse poled structure in which opposite voltages are alternatively applied to each pair of the first and second periodic electrodes with a predetermined time difference is used.

5. A periodically poled structure of an optical waveguide according to claim 2, wherein the first and second periodic electrodes are arranged at an interval (2 Lc) of two times the coherence length Lc.

6. A periodically poled structure of an optical waveguide according to claim 5, wherein a voltage for DC poling is applied to the first and second periodic electrodes.

7. A periodically poled structure of an optical waveguide according to claim 1, wherein the optical waveguide comprises, a core and a cladding for propagating an optical wave; periodic electrodes formed on one surface of the cladding; a flat electrode formed on the other surface of the cladding, and wherein a width w of the periodic electrode is shorter than ½ of the quasi-phase matching period.

8. A periodically poled structure of an optical waveguide according to claim 7, wherein the periodic electrodes are arranged at an interval of coherence lengths Lc every two pairs of the first and second electrodes.

9. A periodically poled structure of an optical waveguide according to claim 6, wherein the periodic electrodes are arranged at an interval 2 Lc of two times the coherence length Lc.

10. A periodically poled structure of an optical waveguide according to claim 1, wherein a distance between the electrodes is 10 Lc or less, and a width of the periodic electrode is 0.1 to 0.8 Lc.

11. A periodically poled structure of an optical waveguide according to claim 1, wherein an electric field applied to the electrodes is calculated in accordance with the periodically poled structure, a width of the periodic electrode, a distance between the electrodes and the voltage applied to the electrodes, and a mean distribution of non-linear optical coefficients contributing to a poled electric field distribution is defined from a distribution of non-linear optical coefficients induced from the calculated electric field, thereby determining a quasi-phase matching efficiency, and wherein the width of the periodic electrode and the distance between the electrodes are determined such that the quasi-phase matching efficiency falls within a range of 10% of the maximum value to the maximum value in the quasi-phase matching efficiency distribution of the non-linear optical coefficients depending on the distance between the electrodes and the width of the periodic electrode.

12. An optical waveguide having a periodically poled structure, comprising: a core and a cladding for propagating an optical wave; and periodic electrodes for inducing a quasi-phase matching, wherein a width w of the periodic electrode is shorter than ½ of a quasi-phase matching period.

13. An optical waveguide having a periodically poled structure according to claim 12, further comprising: first periodic electrodes formed on one surface of the cladding; and second periodic electrodes formed on the other surface of the cladding, wherein the first and second periodic electrodes are arranged at an interval of coherence length Lc or at an interval 2 Lc of two times the coherence length every two pairs of the first and second periodic electrodes.

14. An optical waveguide having a periodically poled structure according to claim 12, further comprising: periodic electrodes formed on one surface of the cladding; and a plate type electrode formed on the other surface of the cladding, wherein the periodic electrodes are arranged at an interval of coherence length Lc or at an interval 2 Lc of two times the coherence length every two pairs of the first and second periodic electrodes.

15. A method of determining an quasi-phase matching efficiency in a periodically poled structure of an optical waveguide having periodic electrodes for inducing a quasi-phase matching, the method comprising: a step of calculating an electric field applied to the electrodes on the basis of the periodically poled structure, a width of the periodic electrodes, a distance between the electrodes, and a voltage applied to the electrodes; and a step of defining a mean distribution of a non-linear optical coefficient contributing to a distribution of a poled electric field from a distribution of the non-linear optical coefficient induced from the calculated electric field, thereby determining the quasi-phase matching efficiency.

16. A method of determining an quasi-phase matching efficiency in a periodically poled structure of an optical waveguide according to claim 15, wherein the distribution of the non-linear optical coefficients is proportional to a strength distribution of the electric field generated in the optical waveguide.

17. A method of determining an quasi-phase matching efficiency in a periodically poled structure of an optical waveguide according to claim 15, wherein the mean distribution of the non-linear optical coefficients is defined by the following equation:

$$<d_2(w,d)> \equiv \frac{1}{2Lc}\left[\int_0^{Lc} d_2(x,w,d)\,dx - \int_{-Lc}^0 d_2(x,w,d)\,dx\right],$$

where, w is the width of periodic electrodes, Lc is a coherence length, and d is a distance between the electrodes.

18. A method of determining an quasi-phase matching efficiency in a periodically poled structure of an optical waveguide according to claim 15, wherein the width of the periodic electrode and the distance between the electrodes are determined such that the quasi-phase matching efficiency falls within a range of 10% of the maximum value to the maximum value in the quasi-phase matching efficiency distribution of the non-linear optical coefficients depending on the distance between the electrodes and the width of the periodic electrode.

* * * * *